United States Patent [19]

Murphy

[11] 3,864,412
[45] Feb. 4, 1975

[54] REMOVAL OF CARBONYL COMPOUNDS FROM 4-VINYLCYCLOHEXENE

[75] Inventor: Donald E. Murphy, University Heights, Ohio

[73] Assignee: The B. F. Goodrich Company, Akron, Ohio

[22] Filed: May 31, 1973

[21] Appl. No.: 365,512

[52] U.S. Cl............. 260/666 A, 208/308, 208/310, 208/299, 210/41, 260/708
[51] Int. Cl............................................. C01c 13/20
[58] Field of Search.................. 260/666 A; 208/308

[56] References Cited
UNITED STATES PATENTS
2,526,499  10/1950  Paulsen.............................. 208/307

*Primary Examiner*—Delbert E. Gantz
*Assistant Examiner*—Veronica O'Keefe
*Attorney, Agent, or Firm*—J. Hughes Powell, Jr.

[57] ABSTRACT

Carbonyl compound impurities are removed almost quantitatively from 4-vinylcyclohexene by contacting 4-vinylcyclohexene with attapulgite clay.

4 Claims, No Drawings

REMOVAL OF CARBONYL COMPOUNDS FROM 4-VINYLCYCLOHEXENE

BACKGROUND OF THE INVENTION 4-vinylcyclohexene is formed readily by the dimerization of 1,3-butadiene (butadiene). This reaction can occur spontaneously during the storage of butadiene and can also be promoted catalytically.

As is true of many compounds containing a carbon-to-carbon double bond, butadiene and 4-vinylcyclohexene can react with atmospheric oxygen to form peroxides; these in turn rearrange to form compounds containing the carbonyl group. Such compounds may be present in small amounts, and their presence is undesirable because they are poisons at levels above about 50 ppm for the catalysts used in stereospecific and other polymerizations. A small fraction comprising about 0.05 to about 0.1% (500–1,000 ppm) by weight of a commercial 4-vinylcyclohexene stream consists of carbonyl compounds that cannot be separated economically from the 4-vinylcyclohexene by distillation or fractionation.

Other methods of carbonyl removal have been tried. It is possible, for instance, to hydrogenate the carbonyl selectively, and then remove the reduced product by suitable physical methods. While this approach is valid for experimental scale work, it is difficult for commercial processes.

Carbonyl compound removal was attempted by contacting a 4-vinylcyclohexene stream with adsorbents including activated carbon, bauxite, fuller's earth, silica gel and various zeolites. They were only marginally effective in carbonyl removal from 4-vinylcyclohexene.

Molecular sieves were found to be ineffective with 4-vinylcyclohexene as received after initial distillation; the 4-vinylcyclohexene stream contained relatively large amounts of water, and attempts to remove carbonyls by molecular sieve treatment resulted in rapid and exothermic adsorption of water onto the molecular sieves with little effective reduction in carbonyl level. 4-vinylcyclohexene can be dried by distillation, but the carbonyl level is not reduced significantly below 150 ppm in the process. In addition, the drying step is not economical, for the wet 4-vinylcyclohexene can be used in the preparation of a number of polymers and copolymers. The combined processes of drying 4-vinylcyclohexene and then treating it with molecular sieves are expensive, and carbonyl level is not reduced substantially below 50 ppm. A simpler, less expensive process is desired for removing carbonyls from 4-vinylcyclohexene.

SUMMARY OF THE INVENTION

Carbonyl compound impurities are removed almost quantitatively (i.e., well below 50 ppm) from a wet or dry 4-vinylcyclohexene process stream by contacting a wet or dry 4-vinylcyclohexene process stream containing minor amounts of carbonyl compound impurities with attapulgite clay, and then separating from said attapulgite clay substantially carbonyl-free 4-vinylcyclohexene.

DETAILED DESCRIPTION

Carbonyl compound impurities are removed almost quantitatively (i.e., reduced well below 50 ppm) from a wet or dry 4-vinylcyclohexene process stream by contacting said stream with attapulgite clay, and then separating from said attapulgite clay substantially carbonyl-free 4-vinylcyclohexene. Attapulgite clay is used at a concentration of from about 2% to about 100% and more preferably from about 4% to about 15% by weight of 4-vinylcyclohexene. Even more preferably, attapulgite clay is used at a concentration of from about 5% to about 11% by weight of 4-vinylcyclohexene.

Attapulgite is a naturally occurring adsorbent clay; a typical analysis is 55.03% $SiO_2$, 10.24% $Al_2O_3$, 3.53% $Fe_2O_3$, 10.49% $M_gO$, 0.47% $K_2O$, 9.73% $H_2O$ removed at 150°C., and 10.13% $H_2O$ removed at higher temperatures; 99.62% total (Kirk-Othmer *Encyclopedia of Chemical Technology*, Second Edition). Said clay can be calcined to reduce combined moisture to about 5% or less and can be carried to 0% free moisture. Particle size can be varied from about ½ mesh to about 300/400 mesh and smaller, more preferably from about 2/4 mesh to about 30/60 mesh.

Fuller's earth is composed primarily of attapulgite and montmorillonite and is unsatisfactory to remove carbonyls from 4-vinylcyclohexene. Fuller's earth used for experimental work mentioned hereinafter had a typical chemical composition of 56.87% $SiO_2$, 12.01% $Al_2O_3$, 3.43% $Fe_2O_3$, 7.12% MgO, 0.51% $K_2O$, 0.99% $TiO_2$, 0.08% $MnO_2$, 1.18% CaO, 0.11% $Na_2O$, 0.55% $P_2O_5$ and 17.30% other materials lost on ignition; 100.15% total.

Any conventional contacting technique may be used for carbonyl removal in a batch or continuous operation. The 4-vinylcyclohexene can be saturated with water but generally contains from 0% to about 0.5% water. The contacting can occur at a temperature of from about 5°C. to about 300°C., and more preferably from about 20°C. to about 50°C. After the contacting period, substantially carbonyl-free 4-vinylcyclohexene containing less than 50 ppm carbonyl compounds can be separated from said clay by conventional methods such as filtration and the like. The clay can be regenerated by drying in a kiln or in situ by methods known to those skilled in the art, but the low clay cost generally makes regeneration unnecessary.

Other common adsorbent and filtering media are substantially less effective in removing carbonyls, or are affected adversely by water present in the process stream. Such adsorbents include activated carbon, bauxite, fuller's earth, various zeolites, molecular sieves (aluminosilicates), silica gel and the like. Surprisingly, attapulgite is much more effective in removing carbonyls from 4-vinylcyclohexene than is fuller's earth, even though attapulgite is a primary ingredient or fuller's earth.

Commercially useful resins and viscous oils are obtained by the Lewis acid cationic homopolymerization and copolymerization of 4-vinylcyclohexene. 4-vinylcyclohexene can be dimerized and polymerized and then hydrogenated to give a product useful as a plasticizer or spraying oil. 4-vinylcyclohexene can be reacted with ethylene chlorohydrin to produce a β-chloroether useful as an insecticide. Other uses are known to those skilled in the art.

The following examples illustrate the present invention more fully.

EXAMPLE 1

A wet process stream of 4-vinylcyclohexene containing 465 ppm carbonyls is contacted with attapulgite clay at 25°C. The clay is 15% by weight of the 4-vinylcyclohexene; 4-vinylcyclohexene flow rate is 1.3 ml/min. The effluent stream contains less than 15 ppm carbonyls.

EXAMPLE 2

The same 4-vinylcyclohexene stream used in Example 1 is passed through a bed of 5 A molecular sieves. Input stream temperature is 25°C; output temperature is about 40°C. because of the evolution of heat on the adsorption of water from the stream by the molecular sieves. Carbonyl content is above 200 ppm in the effluent.

EXAMPLE 3

The conditions of Example 1 are repeated, using fuller's earth. The effluent stream is found to contain more than 200 ppm carbonyls.

EXAMPLE 4

The conditions of Example 1 are repeated, using activated carbon as the contacting material. The effluent stream contains more than 200 ppm carbonyls.

EXAMPLE 5

In a commercial process for the purification of 4-vinylcyclohexene, a column with a 4-foot diameter is packed with 8/16 mesh attapulgite clay. 4-vinylcyclohexene containing about 500 ppm carbonyls is passed through the column at 25°C. at the rate of 0.44 gal./min. per square foot of column cross section, and 9.4 lb. 4-vinylcyclohexene per pound of attapulgite. The effluent stream will contain less than 50 ppm carbonyls. Multiple adsorbent columns can be used in parallel where high capacity and/or continuous operations are conducted.

I claim:

1. A process for removing carbonyl compounds from 4-vinylcyclohexene to less than 50 ppm wherein 4-vinycyclohexene is contacted with attapulgite clay.

2. A process of claim 1 wherein the amount of attapulgite clay is from about 2% to about 100% by weight of 4-vinylcyclohexene, said 4-vinylcyclohexene contains from 0% water up to about saturation with water, and said 4-vinylcyclohexene is contacted with attapulgite clay at a temperature of from about 5°C. to about 300°C.

3. A process of claim 2 wherein the amount of attapulgite clay is from about 4% to about 15% by weight of 4-vinylcyclohexene, said 4-vinylcyclohexene is contacted with attapulgite clay at a temperature of from about 20°C. to about 50°C. and thereafter separated from said clay, and carbonyl compound level in said 4-vinylcyclohexene is reduced to less than 50 ppm.

4. A process of claim 3 wherein the amount of attapulgite clay is from about 5% to about 11% by weight of 4-vinylcyclohexene.

* * * * *